US008457599B2

(12) United States Patent
Ahmavaara

(10) Patent No.: US 8,457,599 B2
(45) Date of Patent: Jun. 4, 2013

(54) APPARATUS AND METHOD FOR ESTABLISHING A DATA CONNECTION BETWEEN A REMOTE STATION AND A WIRELESS NETWORK

(75) Inventor: Kalle I. Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 12/617,400

(22) Filed: Nov. 12, 2009

(65) Prior Publication Data

US 2010/0197274 A1 Aug. 5, 2010

Related U.S. Application Data

(60) Provisional application No. 61/114,917, filed on Nov. 14, 2008.

(51) Int. Cl.
*H04M 1/66* (2006.01)

(52) U.S. Cl.
USPC ......... 455/411; 455/410; 455/435.1; 455/433

(58) Field of Classification Search
USPC ................. 455/445, 462, 352–355, 230, 410, 455/411, 422.1, 432.1, 433, 435, 435.1–435.2; 370/328, 338, 401
See application file for complete search history.

(56) References Cited

U.S. PATENT DOCUMENTS 6,014,561 A 1/2000 Molne
6,636,491 B1 10/2003 Kari et al.

2003/0166398 A1 9/2003 Netanel
2004/0139204 A1 7/2004 Ergezinger et al.
2005/0020234 A1 1/2005 Livari et al.
2006/0035631 A1 2/2006 White et al.
(Continued)

FOREIGN PATENT DOCUMENTS

CN 1225225 A 8/1999
CN 1613242 A 5/2005
(Continued)

OTHER PUBLICATIONS

International Search Report and Written Opinion—PCT/US2009/064314, International Search Authority—European Patent Office—Aug. 4, 2010.

(Continued)

*Primary Examiner* — Kamran Afshar
*Assistant Examiner* — Marisol Fahnert
(74) *Attorney, Agent, or Firm* — Won Tae Kim

(57) ABSTRACT

Disclosed is a method for establishing a data connection for a remote station. In the method, a wireless network capable of establishing a data connection is found. Based on determining that the remote station is a non-subscribing remote station that does not have an existing subscription relationship that supports establishment of a data connection using the wireless network, an initial connection identity (ICI) value is sent to the wireless network, wherein the ICI value includes a characteristic associated with a non-subscribing remote station. An authentication inquiry is received from the wireless network in response to the sent. ICI value. A response value, responsive to the authentication inquiry, is generated in accordance with pseudo-authentication information associated with the ICI value. The response value is sent to the wireless network for allowing establishment of a data connection between the remote station and the wireless network.

55 Claims, 5 Drawing Sheets

U.S. PATENT DOCUMENTS

| | | |
|---|---|---|
| 2006/0143098 A1 | 6/2006 | Lazaridis |
| 2009/0149175 A1* | 6/2009 | Lopresti et al. ............... 455/433 |
| 2011/0078764 A1 | 3/2011 | Bichot |

FOREIGN PATENT DOCUMENTS

| | | |
|---|---|---|
| JP | 2006524005 A | 10/2006 |
| JP | 2007135085 A | 5/2007 |
| JP | 2007158979 A | 6/2007 |
| KR | 20060015477 A | 2/2006 |
| WO | 2004095803 A1 | 11/2004 |
| WO | 2007127485 A2 | 11/2007 |
| WO | 2009073305 | 6/2009 |

OTHER PUBLICATIONS

Taiwan Search Report—TW098138624—TIPO—Jan. 14, 2013.

* cited by examiner

APPARATUS AND METHOD FOR ESTABLISHING A DATA CONNECTION BETWEEN A REMOTE STATION AND A WIRELESS NETWORK

CLAIM OF PRIORITY UNDER 35 U.S.C. §119

The present Application for Patent claims priority to Provisional Application No. 61/114,917 entitled "Apparatus And Method For Establishing A Data Connection Between A Remote Station And A Wireless Network" filed Nov. 14, 2008, and assigned to the assignee hereof and hereby expressly incorporated by reference herein.

BACKGROUND

1. Field

The present invention relates generally to establishing a data connection between a remote station and a wireless network.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

Data access through a cellular system is based on a prearraigned subscriber format. Data access is not afforded to users who are not subscribers or do not have the benefit of an existing relationship.

There is therefore a need for a technique for establishing a connection for a user who is not a subscriber without requiring upgrades to the existing cellular system.

SUMMARY

An aspect of the present invention may reside in a method for establishing a data connection for a remote station. In the method, a wireless network capable of establishing a data connection is found. Based on determining that the remote station is a non-subscribing remote station that does not have an existing subscription relationship that supports establishment of a data connection using the wireless network, an initial connection identity (ICI) value is sent to the wireless network, wherein the ICI value includes a characteristic associated with a non-subscribing remote station. An authentication inquiry is received from the wireless network in response to the sent ICI value. A response value, responsive to the authentication inquiry, is generated in accordance with pseudo-authentication information associated with the ICI value. The response value is sent to the wireless network for allowing establishment of a data connection between the remote station and the wireless network.

In more detailed aspects of the invention, the remote station may generate the ICI value based on a predefined algorithm associated with establishment of the data connection between a non-subscribing remote station and the wireless network. Further, the remote station may include a secure module that has a challenge-response algorithm, and that generates the response based on the pseudo-authentication information.

In other more detailed aspects of the invention, the ICI value may include randomly selected information. The characteristic associated with a non-subscribing remote station within the ICI may be usage of a specific range of included parameters. The values used within the ICI may be within a range that corresponds a specific authentication entity. The values used within the ICI may be within a range that does not correspond to any specific authentication entity nor to any entity operating authentication entities for subscribing mobile devices. The data connection may be an interact protocol (IP) connection. The ICI value may further include a characteristic associated with a remote station that is soliciting to become at least a temporary subscriber to the wireless network.

Another aspect of the invention may reside in a remote station comprising: means for finding a wireless network capable of establishing a data connection; means for determining that the remote station is a non-subscribing remote station that does not have an existing subscription relationship that supports establishment of a data connection using the wireless network; means for sending an initial connection identity (ICI) value to the wireless network, wherein the ICI value includes a characteristic associated with a non-subscribing remote station; means for receiving an authentication inquiry from the wireless network in response to the sent ICI value; means for generating a response value, responsive to the authentication inquiry, in accordance with pseudo-authentication information associated with the ICI value; and means for sending the response value to the wireless network for allowing establishment of a data connection between the remote station and the wireless network.

Another aspect of the invention may reside in a remote station comprising a processor configured to: find a wireless network capable of establishing a data connection; determine that the remote station is a non-subscribing remote station that does not have an existing subscription relationship that supports establishment of a data connection using the wireless network; send an initial connection identity (ICI) value to the wireless network, wherein the ICI value includes a characteristic associated with a non-subscribing remote station; receive an authentication inquiry from the wireless network in response to the sent ICI value; generate a response value, responsive to the authentication inquiry, in accordance with pseudo-authentication information associated with the ICI value; and send the response value to the wireless network for allowing establishment of a data connection between the remote station and the wireless network.

Yet another aspect of the invention may reside in a computer program product comprising computer-readable medium, comprising: code for causing a computer to find a wireless network capable of establishing a data connection; code for causing a computer to determine that a remote station is a non-subscribing remote station that does not have an existing subscription relationship that supports establishment of a data connection using the wireless network; code for causing a computer to send an initial connection identity (ICI) value to the wireless network, wherein the ICI value includes a characteristic associated with a non-subscribing remote station; code for causing a computer to receive an authentication inquiry from the wireless network in response to the sent ICI value; code for causing a computer to generate a response value, responsive to the authentication inquiry, in accordance with pseudo-authentication information associated with the ICI value; and code for causing a computer to send the response value to the wireless network for allowing establishment of a data connection between the remote station and the wireless network.

Another aspect of the invention may reside in a method for establishing a data connection between a remote station and a wireless network. In the method, an initial connection identity (ICI) value is received from the remote station. The ICI value includes a characteristic associated with a non-subscribing remote station that does not have an existing subscription relationship that supports the establishment of a data connection using the wireless network. An authentication entity is determined based on the ICI value, and the ICI value is forwarded to the determined authentication entity. Pseudo-authentication information is received from the determined authentication entity in response to the ICI value. An authentication process is executed using the pseudo-authentication information to establish a data connection between the remote station and the wireless network.

In more detailed aspects of the invention, the wireless network may determine the authentication entity based on a configuration of the wireless network. The ICI value may be within a range that corresponds to the determined authentication entity. The values used within the ICI may alternatively be within a range that does not correspond to any specific authentication entity nor to any entity operating authentication entities for subscribing mobile devices. The determined authentication entity may be specific to the wireless network. The data connection may be an internet protocol (IP) connection.

In other more detailed aspects of the invention, the wireless network may verify the validity of a response, received from the remote station during the authentication process, based on the pseudo-authentication information to establish the data connection. Alternatively, the authentication entity may verify the validity of a response. Alternatively, the wireless network may not verify the validity of a response.

Another aspect of the invention may reside in a wireless network comprising: means for receiving an initial connection identity (ICI) value from a remote station, wherein the ICI value includes a characteristic associated with a non-subscribing remote station that does not have an existing subscription relationship that supports the establishment of a data connection using the wireless network; means for determining an authentication entity based on the ICI value to the determined authentication entity; means for receiving pseudo-authentication information from the determined authentication entity in response to the ICI value; and means for executing an authentication process using the pseudo-authentication information to establish a data connection between the remote station and the wireless network.

Another aspect of the invention may reside in an apparatus for establishing a data connection comprising a processor configured to: receive an initial connection identity (ICI) value from a remote station, wherein the ICI value includes a characteristic associated with a non-subscribing remote station that does not have an existing subscription relationship that supports the establishment of a data connection using a wireless network; determine an authentication entity based on the ICI value; forward the ICI value to the determined authentication entity; receive pseudo-authentication information from the determined authentication entity in response to the ICI value; and execute an authentication process using the pseudo-authentication information to establish a data connection between the remote station and the wireless network.

Yet another aspect of the invention may reside in a computer program product comprising computer-readable medium, comprising: code for causing a computer to receive an initial connection identity (ICI) value from a remote station, wherein the ICI value includes a characteristic associated with a non-subscribing remote station that does not have an existing subscription relationship that supports the establishment of a data connection using a wireless network; code for causing a computer to determine an authentication entity based on the ICI value; code for causing a computer to receive pseudo-authentication information from the determined authentication entity in response to the ICI value; and code for causing a computer to execute an authentication process using the pseudo-authentication information to establish a data connection with the remote station.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment (UE) or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. The access network may contain alternatively other type of elements such as Access Points (AP) and Access Routers (AR). An access network transports data packets to and from multiple remote stations. The access network may be further connected to additional networks outside the access network, such as a corporate intranet or the Internet, and may transport data packets between each remote station and such outside networks. A remote station that has established an active traffic channel connection via one or more base stations is called an active remote station, and is said to be in a traffic state. A remote station that is in the process of establishing an active traffic channel connection via one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals via the base station is called an uplink, also known as a reverse link. The communication link through which a signals are sent to a remote station via base station is called a downlink, also known as a forward link.

Figure 1:
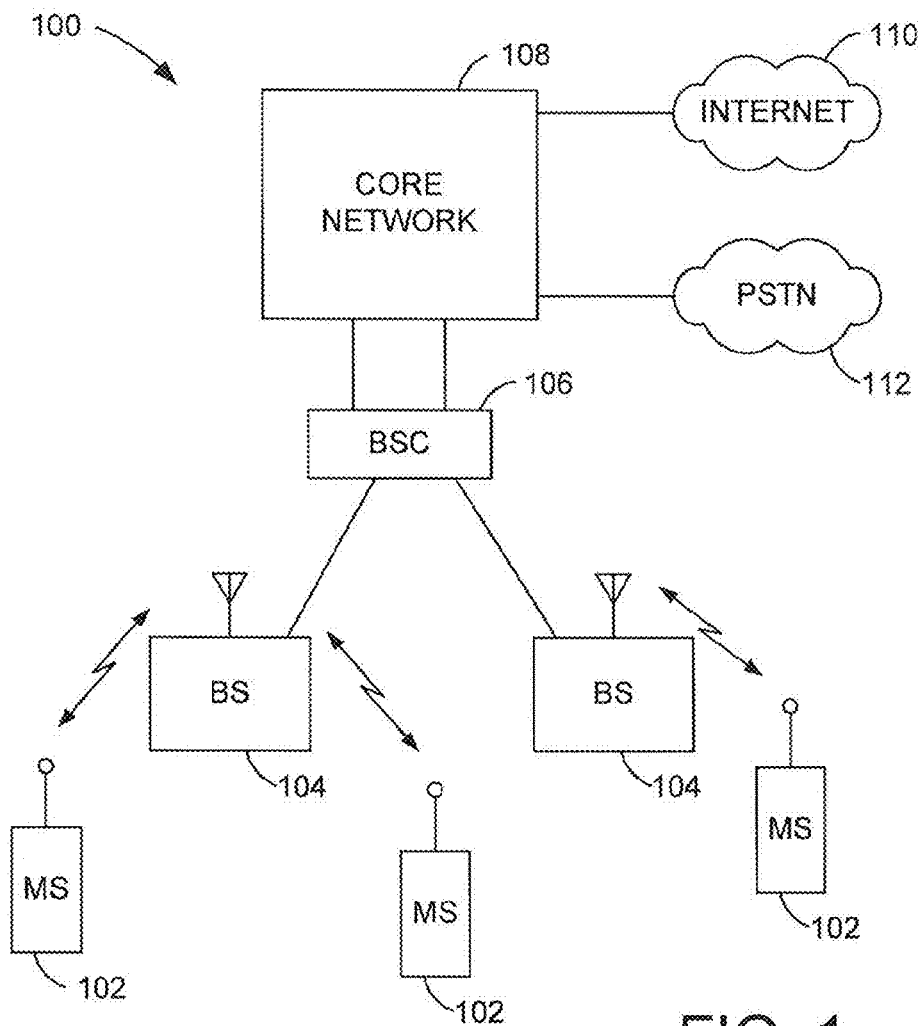
FIG. 1 is a block diagram of an example of a wireless communication system.

With reference to FIG. 1, a wireless communication system 100 includes one or more wireless mobile stations (MS) 102, one or more base stations (BS) 104, one or more base station controllers (BSC) 106, and a core network 108. Core network may be connected to Internet 110 and a Public Switched Telephone Network (PSTN) 112 via suitable backhauls. A typical wireless mobile station may include a handheld phone, mobile Internet device, or a laptop computer. Wireless communication system 100 may employ any one of a number of multiple access techniques such as code division multiple access (COMA), time division multiple access (TDMA), frequency division multiple access (FDMA), space division multiple access (SDMA), polarization division multiple access (PDMA), or other modulation techniques.

Figure 2:
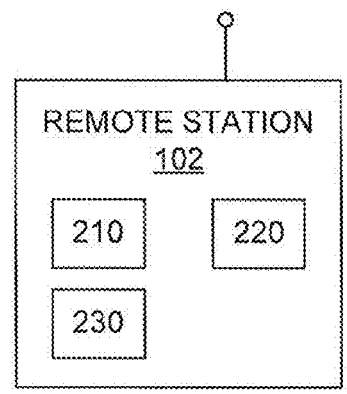
FIG. 2 is a block diagram of an example of a remote station.

With reference to FIG. 2, the remote station 102 may include a processor 210, memory (and/or disk drives) 220, secure module 230, display, keypad or keyboard, microphone, speakers, and the like. Further, the remote station may also include USB, Ethernet and similar interfaces.

Figure 3:
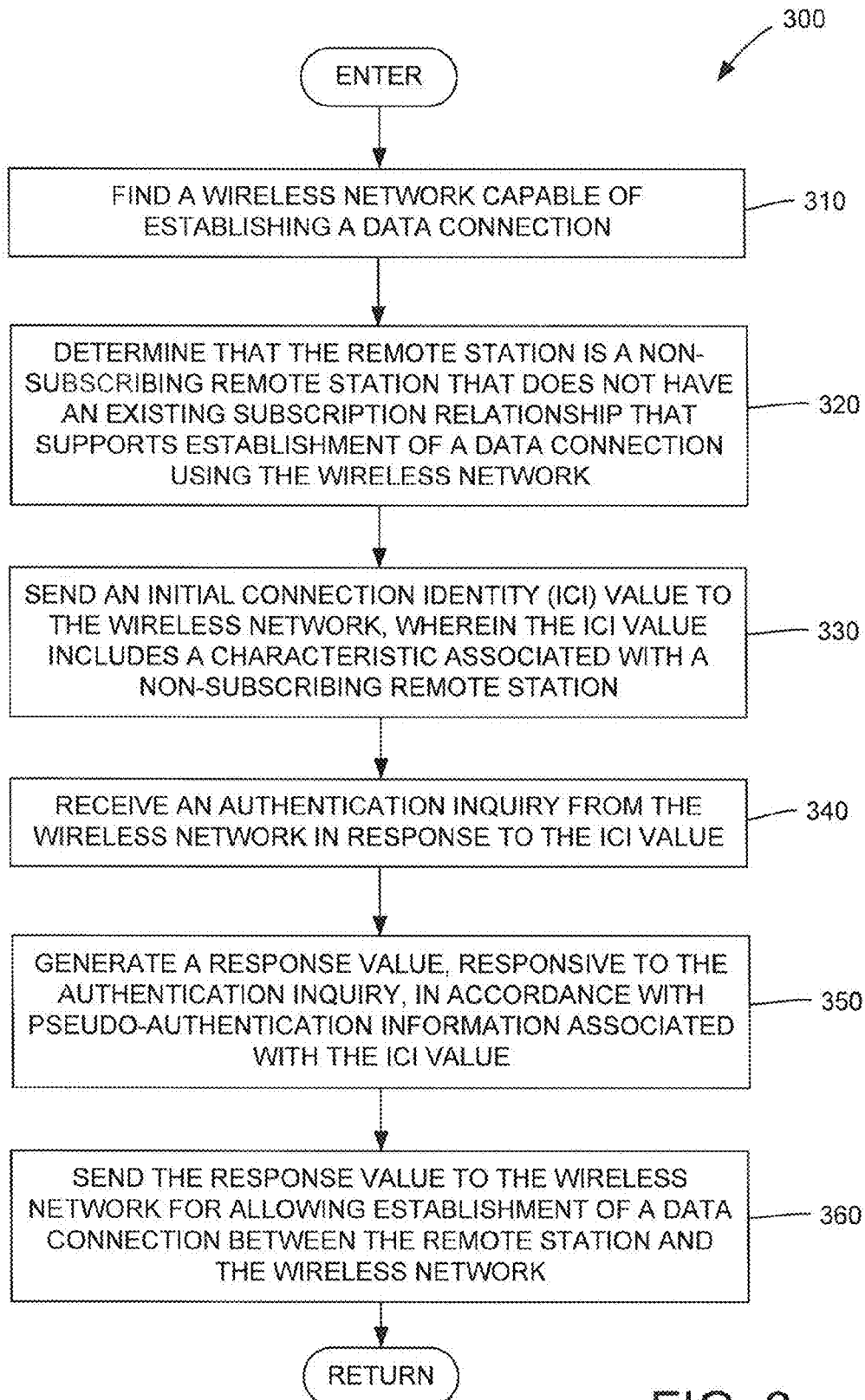
FIG. 3 is a flow diagram of a method for establishing a data connection between a remote station and a wireless network, according to the present invention.
Figure 4:
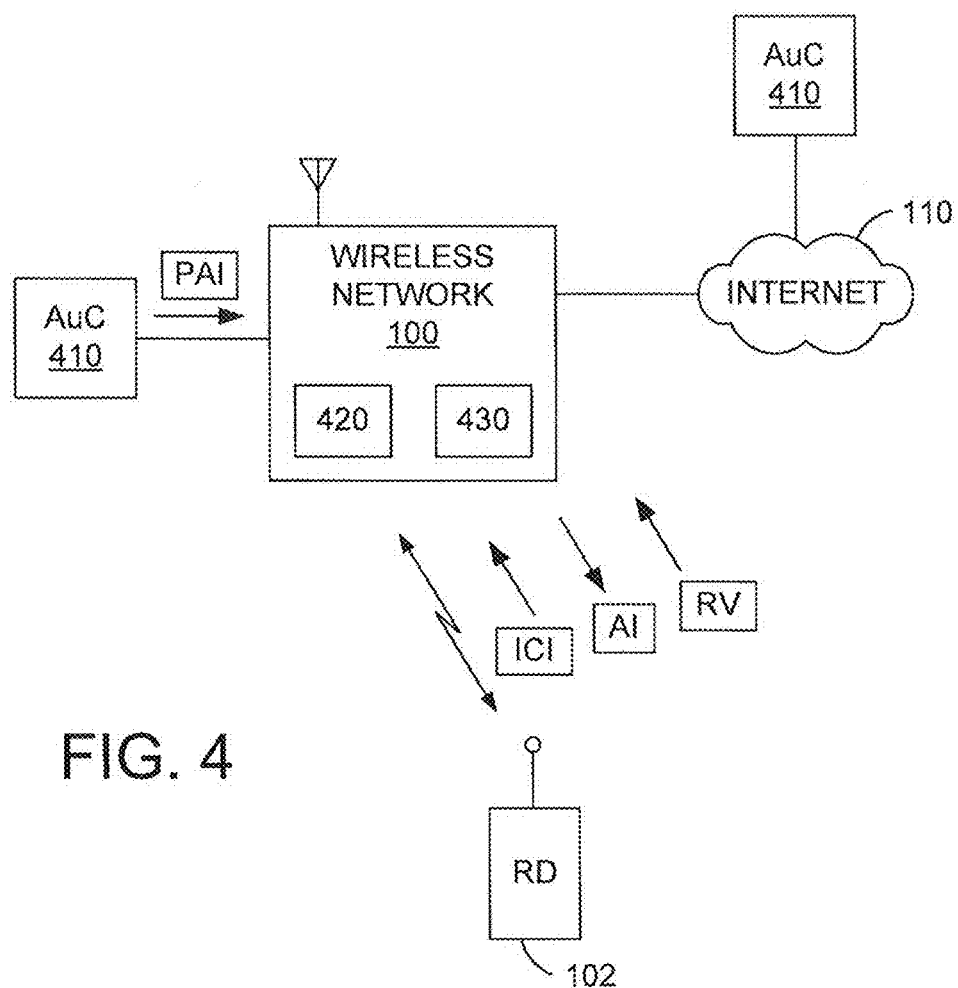
FIG. 4 is a block diagram of a wireless network for providing a data connection with a remote station, according to the present invention.

With reference also to FIGS. 3 and 4, an aspect of the present invention may reside in a method 300 for establishing a data connection for a remote station 102. In the method, a wireless network 100 capable of establishing a data connection is found (step 310). Based on determining that the remote station is a non-subscribing remote station that does not have an existing subscription relationship that supports establishment of a data connection using the wireless network (step 320), an initial connection identity (ICI) value is sent to the wireless network, wherein the ICI value includes a characteristic associated with a non-subscribing remote station (step 330). An authentication inquiry (AI) is received from the wireless network in response to the sent ICI value (step 340). A response value (RV), responsive to the authentication inquiry, is generated in accordance with pseudo-authentication information associated with the ICI value (step 350). The response value is sent to the wireless network for allowing establishment of a data connection between the remote station and the wireless network (step 360).

The remote station 102 may generate the ICI value based on a predefined algorithm associated with establishment of the data connection between a non-subscribing remote station and the wireless network 100. Further, the remote station may include a secure module 230 that has a challenge-response algorithm, and that generates the response based on the pseudo-authentication information. The secure module may also generate the ICI value. The secure module does not solely act as a typical existing secure device, such as a SIM card, that responds according to algorithms based on a shared secret. Instead, the secure module is configured to provide a response value that matches an expected response value corresponding to the pseudo-authentication information.

The ICI value may include randomly selected information. The ICI value may be within a range that corresponds a specific authentication entity. The characteristic associated with a non-subscribing remote station within the ICI may be usage of a specific range of included parameters. The values used within the ICI may be within a range that corresponds a specific authentication entity. The values used within the ICI may be within a range that does not correspond to any specific authentication entity nor to any entity operating authentication entities for subscribing mobile devices. The data connection may be an Internet protocol (IP) connection. The ICI value may further include a characteristic associated with a remote station 102 that is soliciting to become at least a temporary subscriber to the wireless network 100.

Another aspect of the invention may reside in a remote station 102 comprising: means 210 for finding a wireless network 100 capable of establishing a data connection; means 210 for determining that the remote station is a non-subscribing remote station that does not have an existing subscription relationship that supports establishment of a data connection using the wireless network; means 210 for sending an initial connection identity (ICI) value to the wireless network, wherein the ICI value includes a characteristic associated with a non-subscribing remote station; means 210 for receiving an authentication inquiry from the wireless network in response to the sent ICI value; means 210 for generating a response value, responsive to the authentication inquiry, in accordance with pseudo-authentication information associated with the ICI value; and means 210 for sending the response value to the wireless network for allowing establishment of a data connection between the remote station and the wireless network.

Another aspect of the invention may reside in a remote station 102 comprising a processor 210 configured to: find a wireless network 100 capable of establishing a data connection; determine that the remote station is a non-subscribing remote station that does not have an existing subscription relationship that supports establishment of a data connection using the wireless network; send an initial connection identity (ICI) value to the wireless network, wherein the ICI value includes a characteristic associated with a non-subscribing remote station; receive an authentication inquiry from the wireless network in response to the sent ICI value; generate a response value, responsive to the authentication inquiry, in accordance with pseudo-authentication information associated with the ICI value; and send the response value to the wireless network for allowing establishment of a data connection between the remote station and the wireless network.

Yet another aspect of the invention may reside in a computer program product comprising computer-readable medium 220, comprising: code for causing a computer to find a wireless network 100 capable of establishing a data connection; code for causing a computer to determine that a remote station 102 is a non-subscribing remote station that does not have an existing subscription relationship that supports establishment of a data connection using the wireless network; code for causing a computer to send an initial connection identity (ICI) value to the wireless network, wherein the ICI value includes a characteristic associated with a non-subscribing remote station; code for causing a computer to receive an authentication inquiry from the wireless network in response to the sent ICI value; code for causing a computer to generate a response value, responsive to the authentication inquiry, in accordance with pseudo-authentication information associated with the ICI value; and code for causing a computer to send the response value to the wireless network for allowing establishment of a data connection between the remote station and the wireless network.

Figure 5:
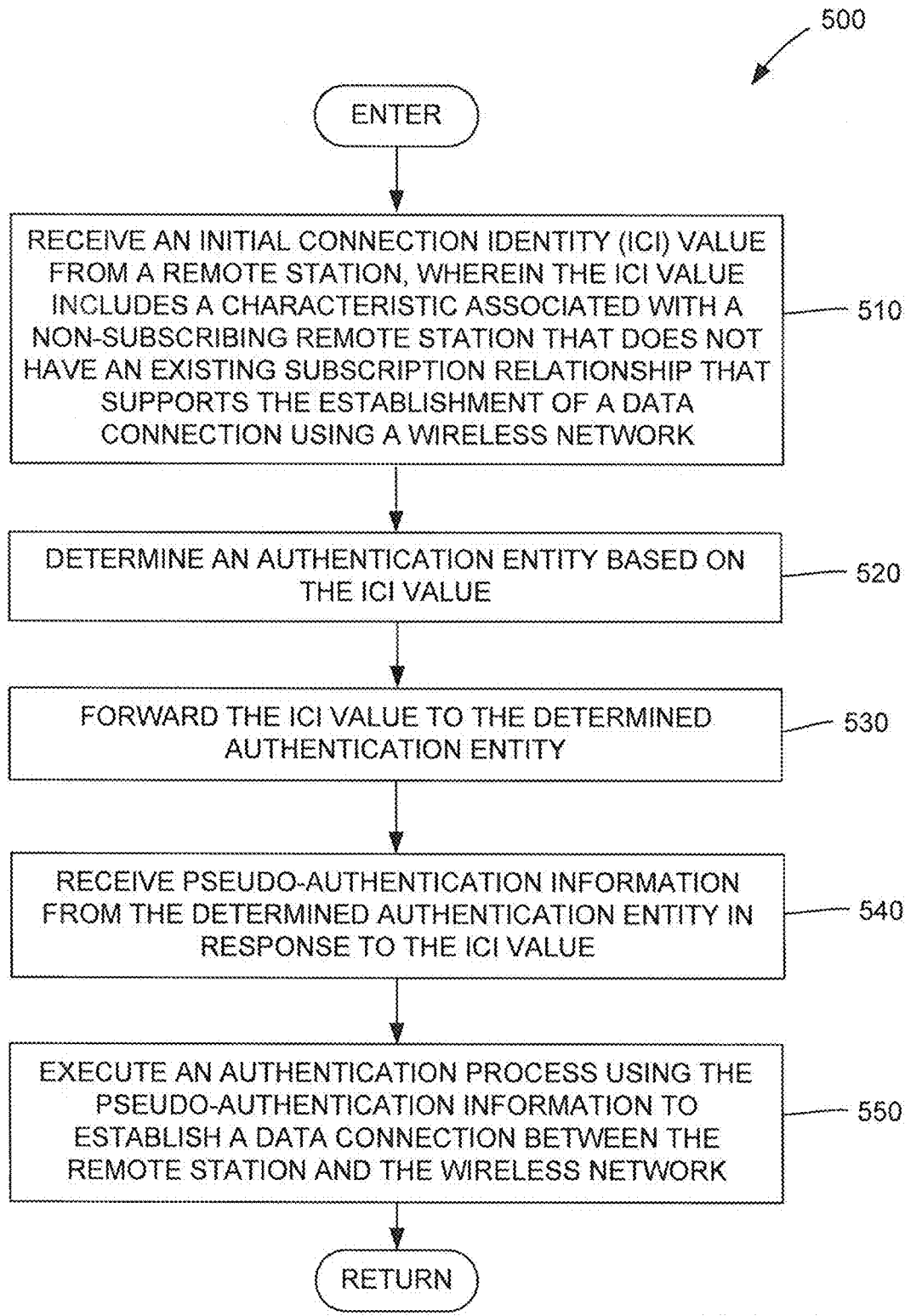
FIG. 5 is a flow diagram of another method for establishing a data connection between a remote station and a wireless network, according to the present invention.

With reference to FIG. 5, another aspect of the invention may reside in a method 500 for establishing a data connection between a remote station 102 and a wireless network 100. In the method, an initial connection identity (ICI) value is received from the remote station (step 510). The ICI value includes a characteristic associated with a non-subscribing remote station that does not have an existing subscription relationship that supports the establishment of a data connection using the wireless network. An authentication entity 410 is determined based on the ICI value (step 520), and the ICI value is forwarded to the determined authentication entity (step 530). Pseudo-authentication information (PAI) is received from the determined authentication entity in response to the ICI value. An authentication process is executed using the pseudo-authentication information to establish a data connection between the remote station and the wireless network.

The wireless network 100 may determine the authentication entity 410 based on a configuration of the wireless network. The ICI value may be within a range that corresponds to the determined authentication entity. The determined authentication entity may be specific to the wireless network. The data connection may be an interne protocol (IP) connection.

The wireless network 100 may verify the validity of a response, received from the remote station 102 during the authentication process, based on the pseudo-authentication information to establish the data connection. Alternatively, the authentication entity 410 may verify the validity of a response.

Another aspect of the invention may reside in a wireless network 100 comprising: means 420 for receiving an initial connection identity (ICI) value from a remote station 102, wherein the ICI value includes a characteristic associated with a non-subscribing remote station that does not have an existing subscription relationship that supports the establishment of a data connection using the wireless network; means 420 for determining an authentication entity based on the ICI value; means 420 for forwarding the ICI value to the determined authentication entity; means 420 for receiving pseudo-authentication information from the determined authentication entity in response to the ICI value; and means 420 for executing an authentication process using the pseudo-authentication information to establish a data connection between the remote station and the wireless network.

Another aspect of the invention may reside in an apparatus 100 for establishing a data connection comprising a processor 420 configured to: receive an initial connection identity (ICI) value from a remote station 102, wherein the ICI value includes a characteristic associated with a non-subscribing remote station that does not have an existing subscription relationship that supports the establishment of a data connection using a wireless network 100; determine an authentication entity based on the ICI value; forward the ICI value to the determined authentication entity; receive pseudo-authentication information from the determined authentication entity in response to the ICI value; and execute an authentication process using the pseudo-authentication information to establish a data connection between the remote station and the wireless network.

Yet another aspect of the invention may reside in a computer program product comprising computer-readable medium 430, comprising: code for causing a computer to receive an initial connection identity (ICI) value from a remote station 102, wherein the ICI value includes a characteristic associated with a non-subscribing remote station that does not have an existing subscription relationship that supports the establishment of a data connection using a wireless network 100; code for causing a computer to determine an authentication entity based on the ICI value; code for causing a computer to receive pseudo-authentication information from the determined authentication entity in response to the ICI value; and code for causing a computer to execute an authentication process using the pseudo-authentication information to establish a data connection with the remote station.

The pseudo authentication information that leads the wireless network 100 to believe that the remote station 102 has been authenticated is not based on a specific shared secret key or credential for the remote station. In the process, the remote station's actual preconfigured identity may not become known to the wireless network, and there may be no actual authentication of its actual preconfigured identity. A main differentiator is that the authentication entity 410 does not need to have a record of the remote station before the process is performed. Typical state of the art authentication entities 1) receive the claimed identity from the remote station, 2) fetch preconfigured information associated to the claimed identity, 3) generate authentication information based on the fetched preconfigured information, and 4) execute the authentication. However, in this technique, steps 2 and 3 are avoided.

The present invention addresses the problem that, in existing wireless networks 100, IP data connectivity is not available until after authentication of a remote station 102 using shared secret based credentials. Further, bootstrapping of the credentials via the cellular connection, without IP connectivity, is not possible.

If the remote station 102 has a credential from another entity, such as one from a roaming relationship, that could be the basis for an initial connection used to bootstrap new credentials between the remote device and the wireless carrier. However, such a technique requires an existing relationship between the remote station and the another entity, which often may not be available or not desirable.

The present invention may provide data connectivity, for internet retailers or content providers, that is not otherwise available. For example, an interne retailer may desire to provide data connectivity to its website to remote stations 102, such as netbooks having equipment for cellular data connectivity, that have no subscription relationship with a provider of a wireless network 100. The internet retailer is willing to, compensate the wireless provider for provisioning a data connection that provides access to just its web site without concern for the network's authentication of the remote device. Existing wireless networks require such authentication. The present invention directs an authentication request from such a remote device to a "special" authentication entity 410 or server that provides pseudo-authentication information that permits the wireless network to perform its existing authentication process.

Figure 6:
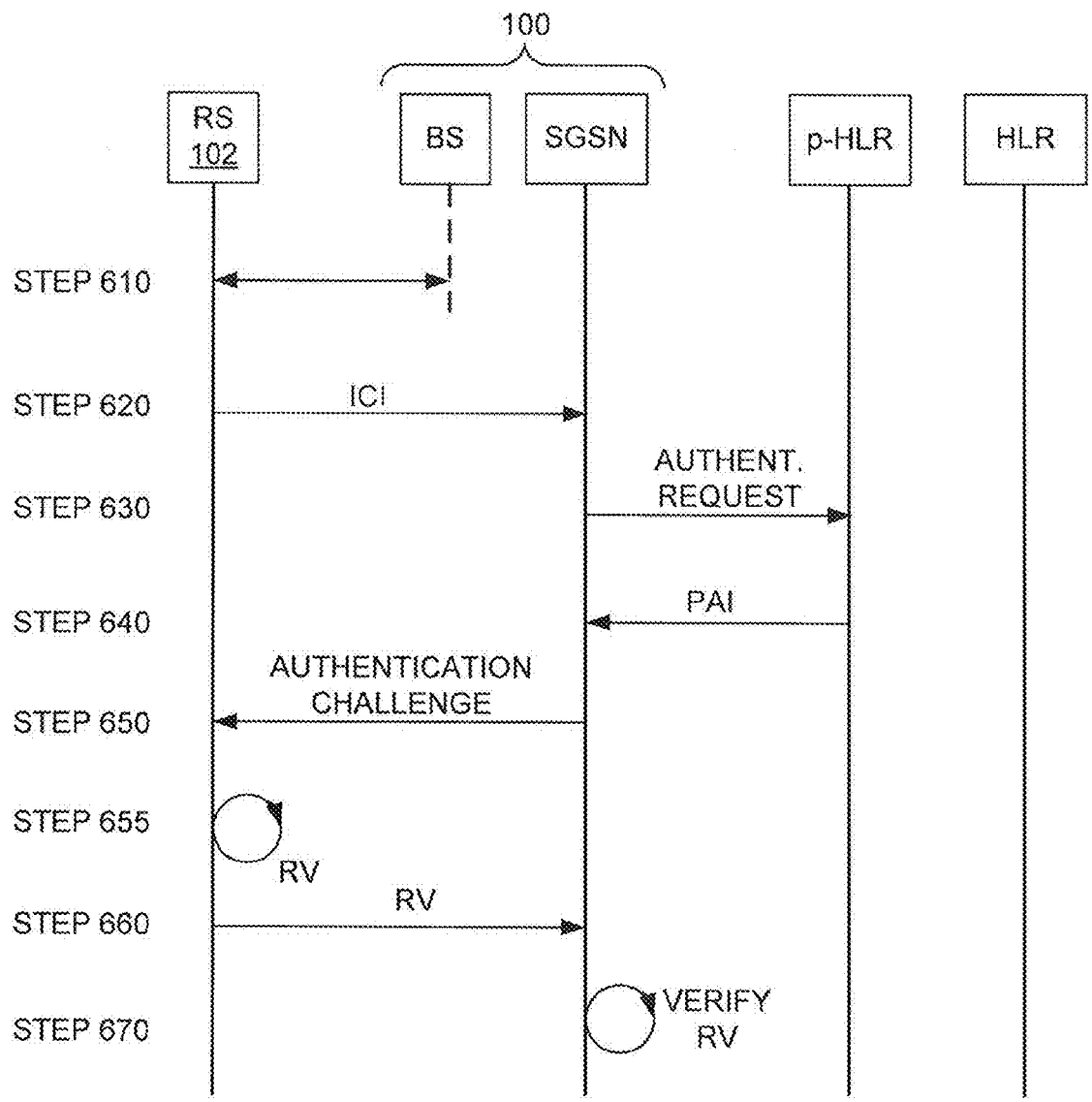
FIG. 6 is a flow diagram of another method for establishing a data connection between a remote station and a wireless network, according to the present invention.

With reference to FIG. 6, as an example, in a 3GPP system, the wireless network 100 includes a base station (BS) and a serving GPRS support node (SGSN). The wireless network has access to Home Location Registers (HLR). In accordance with the present invention, a pseudo-home location register (p-HLR) is provided which acts as the determined authentication entity 410. To the wireless network, the p-HLR appears as any other HLR that provides authentication information in response to the wireless network's authentication process. The p-HLR does not actually provide actual authentication information, but only the p-HLR and the remote device 102 are aware of the pseudo-authentication nature of the transaction.

The remote station and the base station setup initial wireless connectivity allowing the remote station to communicate with the SGSN (step 610). The remote station forwards its ICI value to the SGSN (step 620). The ICI value may be in a range of temporary IMSIs set aside for pseudo-authentication. A typical IMSI has several bits (MCC, MNC) that are used by the SGSN to directly or indirectly identify an HLR based on a mapping table or other means. The ICI value from the remote station corresponds directly or indirectly to a pseudo-home location register (p-HLR). The p-HLR is configured with a predetermined challenge response algorithm, and the remote station is configured with a corresponding challenge-response algorithm. The SGSN, based on the ICI value and the mapping table or other means, forwards the ICI values and a request for authentication information either directly or indirectly to the p-HLR (step 630). The p-HLR responds to the ICI value and the request for authentication information by forwarding pseudo-authentication information (in the form of an authentication vector) to the SGSN (step 640), which forwards an authentication challenge to the remote station based on the pseudo-authentication infonnation (step 650). The challenge is generated according to the predetermined challenge-response algorithm. The remote station responds to the challenge with a challenge response (the response value RV) generated according to the corresponding challenge-response algorithm (steps 655 and 660). If the challenge response is valid (step 670), the remote station receives data connectivity access to a gateway GPRS support node (GGSN). The received data connectivity, established after execution of pseudo-authentication may be limited connectivity that permits the remote station to carry only a pre-defined set of actions. These actions may be e.g. an exchange of data connectivity credentials between a home location register (HLR) and the remote station or consumption of other services which the wireless network is configured to allow for the remote station. The ICI value may be a randomly generated International Mobile Subscriber Identity (IMSI) value within a range corresponding to the p-HLR.

Thus, dynamic bootstrapping of cellular credentials over a limited bootstrap cellular connection is possible with minimal changes to the cellular devices and infrastructure. Connecting into a cellular system (GPRS, UMTS, DO, etc.) requires the existence of a preconfigured shared secret at the device or UICC and in an AAA server/HLR in network. This preconfigured arrangement makes it very difficult to dynamically create cellular subscriptions as the devices must be preprovisioned with carrier specific credentials before they can connect to the wireless network. For example, notebook computers and electronic reading devices must be preprovisioned with a specific subscription to allow them to connect to the cellular network. Thus, it has not been possible to ship generic versions of such devices that could he used in any cellular system.

Cellular credentials could be dynamically bootstrapped over a temporary anonymous cellular connection. The bootstrapping may be done over the same system from which the credentials are to be dynamically configured. The technique allows dynamic provisioning of cellular connectivity credentials to a generic cellular device. This arrangement would allow manufacturing of connected wireless devices that could dynamically be associated to any wireless network without any network specific preprovisioning either at the device or at the network itself. This arrangement would also allow manufacturing and deployment of wireless networks that could dynamically allow any wireless device without any wireless device specific preprovisioning either at the device or at the network itself. This could provide expanded service opportunities, both at device side as in the infrastructure side by creating the required hardware and software to enable this type of dynamic connectivity arrangement.

The remote station device does not need to be preconfigured with an identity pointing to a specific subscription stored in some specific subscription database in the network. In such a case, the serving networks can route the authentication to a special authentication node based on the identity provided by the device. The special authentication node as well as the device can generate the same keys without a predefined secret. These derived keys can be used to gain connectivity to the serving network.

The remote station 102 may be a wireless device, and the wireless network 100 may be a cellular system or other wireless network such as WiFi or any access network utilizing any licenced or unlicenced access spectrum. A wireless device may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM Memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on as one or more instructions or code on a computer-readable medium. Computer-readable media includes computer storage media that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for establishing a data connection for a remote station, comprising: finding a wireless network capable of establishing a data connection; determining that the remote station is a non-subscribing remote station that does not have an existing subscription relationship that supports establishment of a data connection using the wireless network; sending an initial connection identity (ICI) value to the wireless network, wherein the ICI value includes a characteristic associated with a non-subscribing remote station; receiving an authentication inquiry from the wireless network in response to the sent ICI value; generating a response value, responsive to the authentication inquiry, in accordance with pseudo-authentication information associated with the ICI value; and sending the response value to the wireless network for allowing establishment of a data connection between the remote station and the wireless network.

2. A method for establishing a data connection as defined in claim 1, wherein the remote station generates the ICI value based on a predefined algorithm associated with establishment of the data connection between a non-subscribing remote station and the wireless network.

3. A method for establishing a data connection as defined in claim 1, wherein the ICI value includes randomly selected information.

4. A method for establishing a data connection as defined in claim 1, wherein the ICI value is within a range that corresponds a specific authentication entity.

5. A method for establishing a data connection as defined in claim 1, wherein the ICI value is within a range that does not correspond to any specific authentication entity serving subscribing remote stations.

6. A method for establishing a data connection as defined in claim 1, wherein the remote station includes a secure module that has a challenge-response algorithm, and that generates the response based on the pseudo-authentication information.

7. A method for establishing a data connection as defined in claim 1, wherein the data connection is an interne protocol (IP) connection.

8. A method for establishing a data connection as defined in claim 1, wherein the ICI value further includes a characteristic associated with a remote station that is soliciting to become a subscriber to the wireless network.

9. A remote station, comprising: means for finding a wireless network capable of establishing a data connection; means for determining that the remote station is a non-subscribing remote station that does not have an existing subscription relationship that supports establishment of a data connection using the wireless network; means for sending an initial connection identity (ICI) value to the wireless network, wherein the ICI value includes a characteristic associated with a non-subscribing remote station; means for receiving an authentication inquiry from the wireless network in response to the sent ICI value; means for generating a response value, responsive to the authentication inquiry, in accordance with pseudo-authentication information associated with the ICI value; and means for sending the response value to the wireless network for allowing establishment of a data connection between the remote station and the wireless network.

10. A remote station as defined in claim 9, further comprising means for generating the ICI value based on a predefined algorithm associated with establishment of the data connection between a non-subscribing remote station and the wireless network.

11. A remote station as defined in claim 9, wherein the ICI value includes randomly selected information.

12. A remote station as defined in claim 9, wherein the ICI value is within a range that corresponds a specific authentication entity.

13. A remote station as defined in claim 9, wherein the ICI value is within a range that does not correspond to any specific authentication entity serving subscribing remote stations.

14. A remote station as defined in claim 9, wherein the data connection is an interne protocol (IP) connection.

15. A remote station as defined in claim 9, wherein the ICI value further includes a characteristic associated with a remote station that is soliciting to become a subscriber to the wireless network.

16. A remote station, comprising: a processor configured to: find a wireless network capable of establishing a data connection; determine that the remote station is a non-subscribing remote station that does not have an existing subscription relationship that supports establishment of a data connection using the wireless network; send an initial connection identity (ICI) value to the wireless network, wherein the ICI value includes a characteristic associated with a non-subscribing remote station; receive an authentication inquiry from the wireless network in response to the sent ICI value; generate a response value, responsive to the authentication inquiry, in accordance with pseudo-authentication information associated with the ICI value; and send the response value to the wireless network for allowing establishment of a data connection between the remote station and the wireless network.

17. A remote station as defined in claim 16, wherein the ICI value is generated based on a predefined algorithm associated with establishment of the data connection between a non-subscribing remote station and the wireless network.

18. A remote station as defined in claim 16, wherein the ICI value includes randomly selected information.

19. A remote station as defined in claim 16, wherein the ICI value is within a range that corresponds a specific authentication entity.

20. A remote station as defined in claim 16, wherein the ICI value is within a range that does not correspond to any specific authentication entity serving subscribing remote stations.

21. A remote station as defined in claim 16, wherein the data connection is an internet protocol (IP) connection.

22. A remote station as defined in claim 16, wherein the ICI value further includes a characteristic associated with a remote station that is soliciting to become a subscriber to the wireless network.

23. A computer program product, comprising: non-transitory computer-readable medium, comprising: code for causing a computer to find a wireless network capable of establishing a data connection; code for causing a computer to determine that a remote station is a non-subscribing remote station that does not have an existing subscription relationship that supports establishment of a data connection using the wireless network; code for causing a computer to send an initial connection identity (ICI) value to the wireless network, wherein the ICI value includes a characteristic associated with a non-subscribing remote station; code for causing a computer to receive an authentication inquiry from the wireless network in response to the sent ICI value; code for causing a computer to generate a response value, responsive to the authentication inquiry, in accordance with pseudo-authentication information associated with the ICI value; and code for causing a computer to send the response value to the wireless network for allowing establishment of a data connection between the remote station and the wireless network.

24. A computer program product as defined in claim 23, wherein the ICI value is generated based on a predefined algorithm associated with establishment of the data connection between a non-subscribing remote station and the wireless network.

25. A computer program product as defined in claim 23, wherein the ICI value includes randomly selected information.

26. A computer program product as defined in claim 23, wherein the ICI value is within a range that corresponds to a specific authentication entity.

27. A computer program product as defined in claim 23, wherein the ICI value is within a range that does not correspond to any specific authentication entity serving subscribing remote stations.

28. A computer program product as defined in claim 23, wherein the data connection is an internet protocol (IP) connection.

29. A computer program product as defined in claim 23, wherein the ICI value further includes a characteristic associated with a remote station that is soliciting to become a subscriber to the wireless network.

30. A method for establishing a data connection between a remote station and a wireless network, comprising: receiving an initial connection identity (ICI) value from the remote station, wherein the ICI value includes a characteristic associated with a non-subscribing remote station that does not, have an existing subscription relationship that supports the establishment of a data connection using the wireless network; determining an authentication entity based on the ICI value; forwarding the ICI value to the determined authentication entity; receiving pseudo-authentication information from the determined authentication entity in response to the ICI value; and executing an authentication process using the pseudo-authentication information to establish a data connection between the remote station and the wireless network.

31. A method for establishing a data connection as defined in claim 30, wherein the wireless network determines the authentication entity based on a configuration of the wireless network.

32. A method for establishing a data connection as defined in claim 30, wherein the ICI value is within a range that corresponds to the determined authentication entity.

33. A method for establishing a data connection as defined in claim 30, wherein the wireless network verifies the validity of a response, received from the remote station during the authentication process, based on the pseudo-authentication information to establish the data connection.

34. A method for establishing a data connection as defined in claim 30, wherein the authentication entity verifies the validity of a response, received from the remote station during the authentication process, based on the pseudo-authentication information to establish the data connection.

35. A method for establishing a data connection as defined in claim 30, wherein the data connection is an internet protocol (IP) connection.

36. A method for establishing a data connection as defined in claim 30, wherein the determined authentication entity is specific to the wireless network.

37. A wireless network, comprising: means for receiving an initial connection identity (ICI) value from a remote station, wherein the ICI value includes a characteristic associated with a non-subscribing remote station that does not have an existing subscription relationship that supports the establishment of a data connection using the wireless network; means for determining an authentication entity based on the ICI value; means for forwarding the ICI value to the determined authentication entity; means for receiving pseudo-authentication information from the determined authentication entity in response to the ICI value; and means for executing an authentication process using the pseudo-authentication information to establish a data connection between the remote station and the wireless network.

38. A wireless network as defined in claim 37, wherein the authentication entity is determined based on a configuration of the wireless network.

39. A wireless network as defined in claim 37, wherein the ICI value is within a range that corresponds to the determined authentication entity.

40. A wireless network as defined in claim 37, wherein the ICI value is within a range that does not correspond to any specific authentication entity serving subscribing remote stations.

41. A wireless network as defined in claim 37, further comprising means for verifying the validity of a response, received from the remote station during the authentication process, based on the pseudo-authentication information to establish the data connection.

42. A wireless network as defined in claim 37, wherein the data connection is an internet protocol (IP) connection.

43. A wireless network as defined in claim 37, wherein the determined authentication entity is specific to the wireless network.

44. An apparatus for establishing a data connection, comprising: a processor configured to: receive an initial connection identity (ICI) value from a remote station, wherein the ICI value includes a characteristic associated with a non-subscribing remote station that does not have an existing subscription relationship that supports the establishment of a data connection using a wireless network; determine an authentication entity based on the ICI value; forward the ICI value to the determined authentication entity; receive pseudo-authentication information from the determined authentication entity in response to the ICI value; and execute an authentication process using the pseudo-authentication information to establish a data connection between the remote station and the wireless network.

45. An apparatus as defined in claim 44, wherein the authentication entity is determined based on a configuration of the wireless network.

46. An apparatus as defined in claim 44, wherein the ICI value is within a range that corresponds to the determined authentication entity.

47. An apparatus as defined in claim 44, wherein the ICI value is within a range that does not correspond to any specific authentication entity serving subscribing remote stations.

48. An apparatus as defined in claim 44, wherein the processor is further configured to verify the validity of a response, received from the remote station during the authentication process, based on the pseudo-authentication information to establish the data connection.

49. An apparatus as defined in claim 44, wherein the data connection is an internet protocol (IP) connection.

50. A computer program product, comprising: non-transitory computer-readable medium, comprising: code for causing a computer to receive an initial connection identity (ICI) value from a remote station, wherein the ICI value includes a characteristic associated with a non-subscribing remote station that does not have an existing subscription relationship that supports the establishment of a data connection using a wireless network; code for causing a computer to determine an authentication entity based on the ICI value; code for causing a computer to receive pseudo-authentication information from the determined authentication entity in response to the ICI value; and code for causing a computer to execute an authentication process using the pseudo-authentication information to establish a data connection with the remote station.

51. A computer program product as defined in claim 50, wherein the authentication entity is determined based on a configuration of the wireless network.

52. A computer program product as defined in claim 50, wherein the ICI value is within a range that corresponds to the determined authentication entity.

53. A computer program product as defined in claim 50, wherein the ICI value is within a range that does not correspond to any specific authentication entity serving subscribing remote stations.

54. A computer program product as defined in claim 50, further comprising code for causing a computer to verify the validity of a response, received from the remote station during the authentication process, based on the pseudo-authentication information to establish the data connection.

55. A computer program product as defined in claim 50, wherein the data connection is an internet protocol (IP) connection.

* * * * *